(No Model.)
J. COOK.
HANDLE FOR BRUSH MAKING MACHINES.
No. 492,661. Patented Feb. 28, 1893.
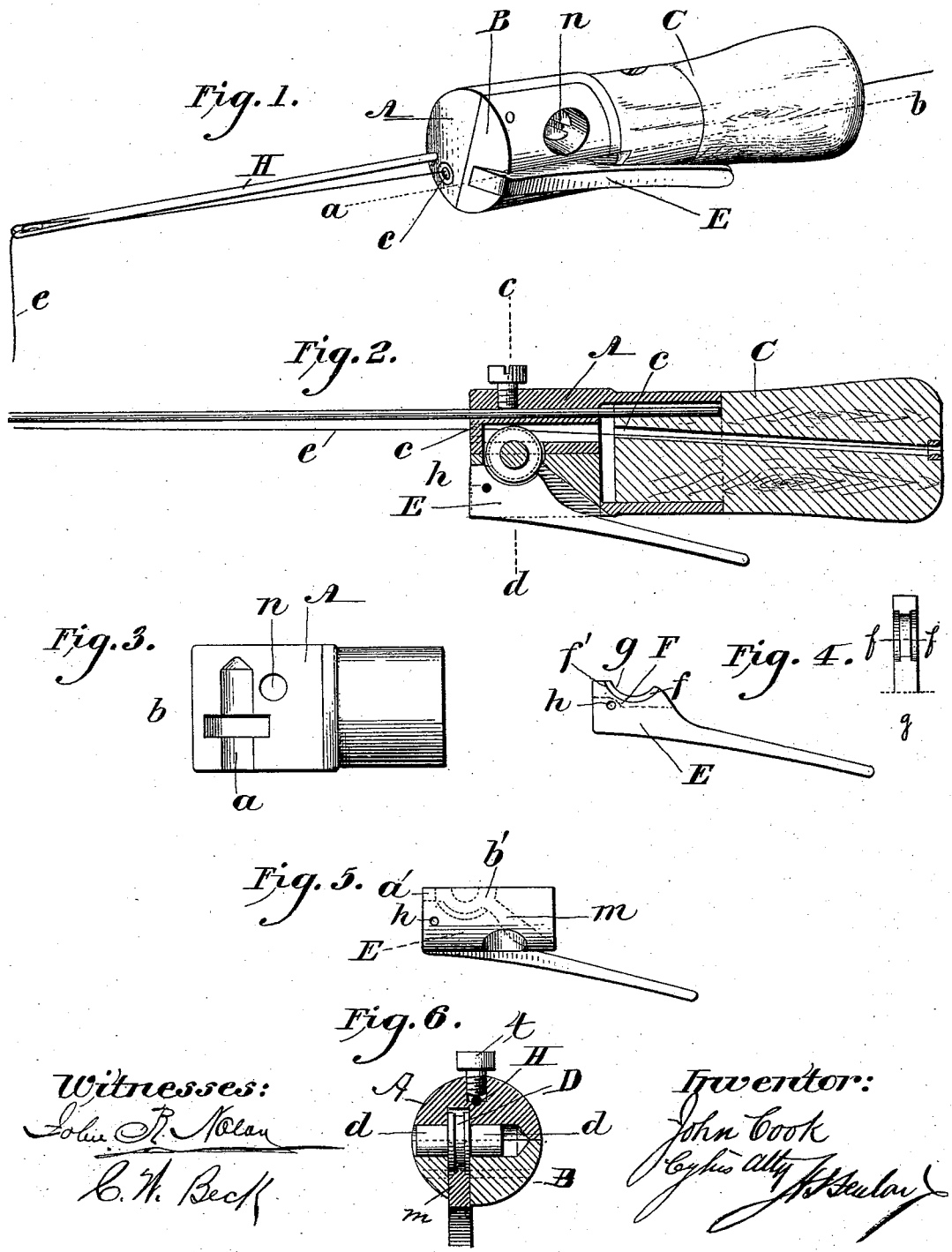

UNITED STATES PATENT OFFICE.

JOHN COOK, OF TRENTON, NEW JERSEY, ASSIGNOR OF ONE-HALF TO DAVID R. BROWN, OF SAME PLACE.

HANDLE FOR BRUSH-MAKING MACHINES.

SPECIFICATION forming part of Letters Patent No. 492,661, dated February 28, 1893.

Application filed May 10, 1892. Serial No. 432,403. (No model.)

*To all whom it may concern:*

Be it known that I, JOHN COOK, a citizen of the United States, residing at Trenton, in the State of New Jersey, have invented certain new and useful Improvements in Handles for Brush-Making Machines, of which the following is a full, clear, and exact description, reference being had to the accompanying drawings, forming a part of this specification.

My invention relates to needle-holding handles adapted for use with brush making machines; and has for its object to enable the operator to grip the wire and apply the proper tensile strain thereto, in wiring the tufts of bristles in brush manufacture.

To these ends my invention consists essentially in a clamping device composed of a peripherally grooved pulley journaled in a semi-cylindrical section of the handle, in combination with a pressure brake set into the other semi-cylindrical section of the handle, and having parallel depressed shoulders on each side of a central wire groove, adapted to receive the edges of the opposite pulley groove; also in an arm or lever externally mounted on the handle and fulcrumed at one end therein, and operating through a recess in the handle, to provide adjustable leverage on the pressure brake by means of manual pressure applied thereto by the operator; also in minor details of the device hereinafter specifically mentioned.

In the accompanying drawings illustrating my invention, Figure 1 is a perspective view of my improved handle. Fig. 2 is a vertical sectional view through the line a—b of Fig. 1. Fig. 3 is a top view of the semi-cylindrical section in which the pulley is mounted. Fig. 4 is a view of the combined pressure brake and lever arm detached. Fig. 5 is a top view of the semi-cylindrical section containing the pressure brake, with the latter in position therein. Fig. 6 is a section on the line c—d of Fig. 2 through the pressure brake, and through the fulcrumed lever arm in which it is mounted, or of which it forms a part.

The semi-cylindrical sections A and B are mounted preferably upon a handle C of wood or other suitable material, to enable the operator to more conveniently grasp the same. In one of said sections, A, shown in top plan view in Fig. 3, are provided longitudinal and lateral recesses $a$ and $b$ crossing each other, the former serving as journal bearings, and the latter as space for the revolution of a peripherally grooved pulley D mounted on shafts $d, d$, revolving in said journal bearings. Said section A is provided with a hole $c$ running through the same from end to end immediately beneath the aforesaid longitudinal recess $a$, to admit of the reception of a wire $e$ passing through the end of the handle and protruding from the front thereof after passing on its way the said peripherally grooved pulley around which it is wrapped once or twice on its passage. The opposite section B of the handle is provided with corresponding longitudinal and lateral recesses $a'$ $b'$ crossing each other; for a similar purpose, in connection with the opposite recesses in the opposite section of the tool. Mounted in said last mentioned section is a lever arm E shown in detail in Fig. 4, pivoted therein, and having its fulcrum upon a pin $h$ passing through the same at its forward end and into such section. Said section B is properly recessed through its exterior at $m$ to permit of the inward play of the rear end of said lever arm so that near its forward end it will pass down through the longitudinal recess $m$ over the space $b'$, provided in said section for the revolution of the grooved pulley D and will actuate a pressure brake provided therein when pressure is applied to the rear end of the fulcrumed lever. Said fulcrumed lever E is constructed as shown in detail in the several figures; that is to say, it is constructed integral with a pressure brake F provided with shoulders $ff$ that may contact with the projecting edges of the groove on the pulley, and between said shoulders is a projecting portion $g$ which fits within the groove of the pulley; or said pressure brake may be constructed as a separate element and mounted in said lever arm. The sections are firmly fastened together by a screw $n$ passing through one section into the other. By this construction I am enabled to grasp the wire firmly as it passes around the pulley; and the lever arm operating the brake, furnishes an adjustable leverage. The construction of the lever arm or the brake mounted therein, with shoulders on either side of the central projection as described, prevents the wire from slipping to either side while passing around the groove of the pulley, and also enables the operator to obtain a firm grip thereon. In this manner the operator holds the wire firmly by manual power applied to the lever arm governing the pressure brake and enables all kinks to be taken out of the wire, which has never heretofore been done by any tool of this character.

My improved tool is adapted for use in drawing wire through a brush block in connection with brush-making machines. The lower section adjacent to the wire exit passage is recessed to a slight depth to receive the end of an eye-pointed needle H, which is fastened therein by a set screw t, or other appropriate means. The wire passing through the handle is strung into the eye of the needle at the end thereof, and any ordinary mattress needle may be used with this tool.

Having thus described my invention, what I claim as new, and desire to secure by Letters Patent, is—

1. In a needle holding handle for operating wire thread, the combination with semi-cylindrical clamping sections, and means for mounting and conveniently grasping the same when in use, of a peripherally grooved pulley journaled in one of said sections, which is bored out longitudinally to admit the passage of the wire, a pressure brake mounted on the opposite section and having a face adapted to fit the groove and shoulders on the periphery of said pulley, and means for actuating said pressure brake by manual pressure applied from the exterior of the section in which it is mounted substantially as described.

2. A needle handle for brush making machines constructed in semi-cylindrical sections, each of them laterally and longitudinally recessed respectively, as described, a peripherally grooved rotating pulley journaled in said recesses respectively, a longitudinal wire passage or opening the length of the handle and contiguous to the said rotating pulley, and a lever fulcrumed at its extreme end in one of said sections, and adapted to act as a pressure brake on the periphery of the pulley; substantially as described.

In testimony whereof I have hereunto affixed my signature this 4th day of May, A. D. 1892.

JOHN COOK.

Witnesses:
DAVID R. BROWN,
H. T. FENTON.